(12) United States Patent
Jehanno

(10) Patent No.: US 11,175,415 B2
(45) Date of Patent: Nov. 16, 2021

(54) METHOD OF DETERMINING A QUANTITY OF A RADIOISOTOPE

(71) Applicant: ORANO CYCLE, Châtillon (FR)

(72) Inventor: Jacky Jehanno, Gaujac (FR)

(73) Assignee: ORANO CYCLE, Paris (FR)

( * ) Notice: Subject to any disclaimer, the term of this patent is extended or adjusted under 35 U.S.C. 154(b) by 0 days.

(21) Appl. No.: 16/954,577

(22) PCT Filed: Dec. 18, 2018

(86) PCT No.: PCT/FR2018/053358
§ 371 (c)(1),
(2) Date: Jun. 17, 2020

(87) PCT Pub. No.: WO2019/122674
PCT Pub. Date: Jun. 27, 2019

(65) Prior Publication Data
US 2020/0333475 A1    Oct. 22, 2020

(30) Foreign Application Priority Data

Dec. 21, 2017 (FR) ...................................... 1762878

(51) Int. Cl.
*G01T 1/167* (2006.01)
*G01T 7/02* (2006.01)

(52) U.S. Cl.
CPC .............. *G01T 1/167* (2013.01); *G01T 7/02* (2013.01)

(58) Field of Classification Search
CPC ................................. G01T 1/167; G01T 7/02
(Continued)

(56) References Cited

U.S. PATENT DOCUMENTS 6,320,193 B1 *  11/2001  Morrison ............... G01N 23/06
                                                     250/393
6,791,093 B2     9/2004  Caldwell et al.
(Continued)

FOREIGN PATENT DOCUMENTS

EP  0130099 A1       1/1985
FR  3075976 B1 *    1/2020 ............. G01T 1/167
(Continued)

OTHER PUBLICATIONS

Search Report for French Application No. FR1762878 dated Aug. 21, 2018.
(Continued)

*Primary Examiner* — David P Porta
*Assistant Examiner* — Gisselle M Gutierrez
(74) *Attorney, Agent, or Firm* — Pearne & Gordon LLP

(57) ABSTRACT

A method of determining a quantity of a first radioisotope in a source term, disintegrating into a second radioisotope, the radioisotopes respectively emitting first and second gamma rays screened by the source term, the method comprising the steps: a) determining the theoretical ratio of counts between the first and second rays emitted in the absence of screening; b) measuring the net counts associated with the first and second rays emitted by the first and second radioisotopes; c) determining the screening rates of the first and second rays by the source term based on the ratio obtained in step a) and the counts obtained in step b); d) determining the quantity of the first radioisotope based on the screening rate of either the first or the second ray determined in step c).

14 Claims, 1 Drawing Sheet

(58) Field of Classification Search
USPC .......................................................... 250/395
See application file for complete search history.

(56) References Cited

U.S. PATENT DOCUMENTS

2006/0231768 A1  10/2006  Rackham et al.
2014/0019094 A1   1/2014  Parvin

FOREIGN PATENT DOCUMENTS

WO       0042446 A1   7/2000
WO    2014145460 A1   9/2014

OTHER PUBLICATIONS

International Search Report for PCT/FR2018/053358 dated Mar. 19, 2019.
Written Opinion for PCT/FR2018/053358 dated Mar. 19, 2019.

* cited by examiner ns application PCT/FR2018/053358, filed on Dec. 18, 2018,
METHOD OF DETERMINING A QUANTITY OF A RADIOISOTOPE

CROSS-REFERENCE TO RELATED APPLICATIONS

This is a National Stage application of PCT international application PCT/FR2018/053358, filed on Dec. 18, 2018, which claims the priority of French Patent Application No. 1762878, filed Dec. 21, 2017, both of which are incorporated herein by reference in their entirety.

TECHNICAL FIELD

The present invention relates to a method for determining a quantity of a first radioisotope contained in a source term. In particular, the present invention implements a gamma spectroscopy measurement for determining the mass of the first radioisotope, the first being plutonium 241.

PRIOR ART

Radioactive waste, and in particular packages of radioactive technological waste, is generally assembled in barrels with a view to the storage thereof. This technological waste is obtained from the operation of workshops and plants of the nuclear industry, for example workshops for producing nuclear fuels using nuclear materials such as uranium and/or plutonium, particularly for producing "MOX" (for "Mixed oxide") fuel. Thus, technological waste from such workshops, for example gloves, sleeves, or any other object made of organic polymer or more specifically of polyethylene and used in glove boxes, are suitable for containing small quantities of residual plutonium and other radioisotopes.

Also, according to the mass and nature (radioactivity level and period) of radioisotopes contained in barrels, the latter are stored either on the surface or underground. It is possible, to a degree, to make a distinction between "poor" barrels from barrels "rich" in radioisotopes which may be stored, respectively, on the surface or underground.

The cost of underground storage being substantially greater than that of surface storage, it is then advised to optimise the assembly of the waste packages in the barrels so as to minimise the radioisotope content thereof, and therefore first and foremost to differentiate "rich" packages from packages "poor" in radioisotopes.

Neutron count measurements are then a method of choice for evaluating the mass of radioisotopes, and more particularly of residual plutonium, in waste packages.

However, this type of measurement is not satisfactory.

Indeed, in order to attain acceptable precision, neutron measurements require a relatively long counting time (at least 900 seconds) per package. The management of packages, as well as the assembly thereof into barrels then finds itself affected both in terms of cycle time and cost.

Moreover, neutron count measurements are costly.

An aim of the present invention is then that of proposing a method for evaluating the mass of radioisotopes, particularly contained in a package, suitable for optimising waste barrel design and management.

A further aim of the present invention is that of proposing a method for evaluating the mass of radioisotopes having a lower cost than the methods known from the prior art.

DESCRIPTION OF THE INVENTION

The aims of the invention are, at least in part, achieved by a method for determining a quantity of a first radioisotope of a source term contained in a package, said first radioisotope is suitable for emitting a first gamma line, a second gamma line is also suitable for being emitted either by the first radioisotope or by a second radioisotope of the source term, the first gamma line and the second gamma line are suitable for being attenuated, each according to a different attenuation rate, by the matrix of the package and the source term per se, the method comprising the following steps:

a) a step of measuring, by at least one gamma detector and according to two diametrically opposed positions in relation to the package, net counts associated with the first and second gamma lines emitted;

b) in the knowledge of the ratio of the counts of the first and second gamma lines in the absence of attenuation and based on the results of step a), a step of determining the attenuation rates of the first and second gamma lines by the package matrix;

c) a step of determining, based on the attenuation rate of one or the other of the first and second gamma lines determined in step c), the quantity, advantageously the mass, of first radioisotope contained in the source term.

It is obvious that the relative counts of the first and second gamma lines in the absence of attenuation of step b) are theoretical counts.

According to an embodiment, the second gamma line is emitted by the second radioisotope, and the method also comprising a step a1) of determining the theoretical count ratio between the first and the second gamma lines emitted by the first and second radioisotopes in the absence of attenuation.

Carrying out such a step a1) may require knowledge of the isotopic composition on the date of measurement.

According to an embodiment, the emission ratios of the first and second gamma lines are stable over time.

According to an embodiment, the emission lines in question may be obtained from one and the same radioelement in which case the theoretical count ratio in the absence of a screen will be constant over time.

According to an embodiment, the second radioisotope is the result of the radioactive disintegration of the first radioisotope.

According to an embodiment, the half-life T2 of the second radioisotope is substantially less than the half-life T1 of the first radioisotope.

According to an embodiment, the source term further comprises a third radioisotope, of the same mass number as the first radioisotope, the isotopic composition between the first and second radioisotopes being known.

According to an embodiment, the method comprises a determination of the isotopic composition.

According to an embodiment, the method further comprises a step of determining a conversion coefficient c/s/g of one or the other of the first and second radioisotopes for counting one or the other of the first and second gamma lines.

According to an embodiment, the conversion coefficient is also determined based on the distance D of the least one gamma detector in relation to the source term.

According to an embodiment, the attenuation rate of one or the other of first and second gamma lines is representative of an equivalent screen comprising a mixture of polyethylene and uranium characteristic of the package matrix, said equivalent screen being characterised by a thickness, referred to as screen thickness, and a polyethylene content.

According to an embodiment, step a) is carried out with two gamma detectors such that two estimations of the quantity, advantageously the mass, of first radioisotope of the source term are obtained following step c).

According to an embodiment, once the ratio of the two estimations conveys an offset of the source term in relation to the gamma detectors, the mean of said estimations is corrected by a correction coefficient.

According to an embodiment, the first radioisotope comprises plutonium 241, the second radioisotope uranium 237, and the third radioisotope americium 241.

The invention also relates to a measurement device suitable for carrying out the method for determining a quantity of a first radioisotope contained in a source term according to the present invention, the device comprising:
- at least one gamma detector;
- a docking station of the source term, the docking station being provided with a scales;
- a computer intended to process gamma line counts collected by the gamma detectors, said computer being also provided with a computer program suitable for determining, based on the gamma ray counts, the quantity of first radioisotope comprised in the source term.

BRIEF DESCRIPTION OF THE DRAWINGS

Further features and advantages will emerge in the following description of the method for determining a quantity of a first radioisotope contained in a source term according to the invention, given by way of non-limiting examples, with reference to the appended drawings wherein.

DETAILED DESCRIPTION OF PARTICULAR EMBODIMENTS

The present invention implements a gamma spectroscopy measurement for estimating a quantity of a first radioisotope of a source term contained in a package.

"Source term" denotes the nature and quantity of radioactive products.

The estimation of the quantity or the mass of first radioisotope is then based on a measurement of the relative intensities of two gamma lines emitted respectively by the first and second radioisotopes and corrected for an attenuation rate of said lines by the matrix formed by the package.

The invention is then particularly suitable for estimating the mass of plutonium 241 of a source term contained, in particular, in a waste package containing polyethylene objects contaminated with a mixture of plutonium and uranium oxides.

Figure 1:
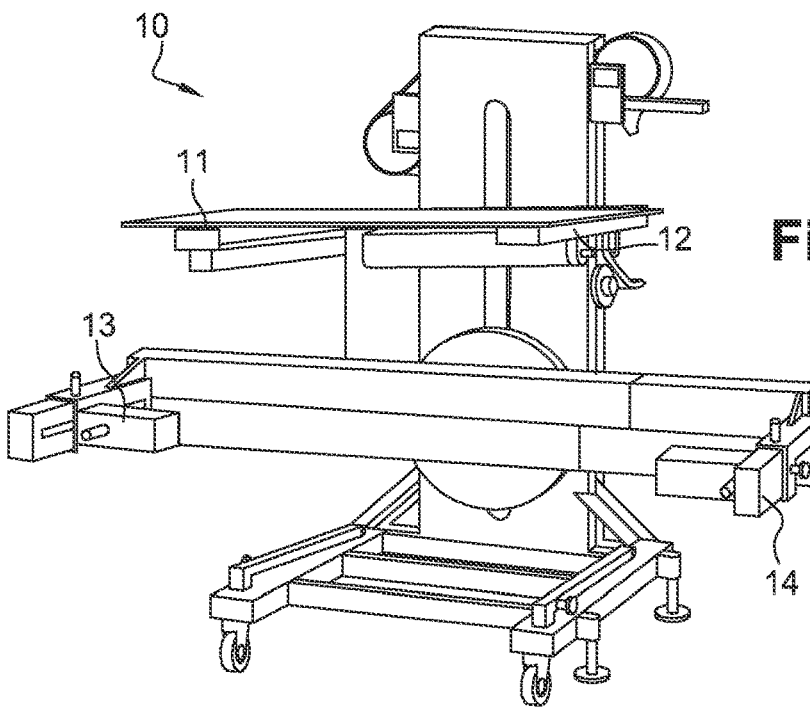
FIG. 1 is a representation of a measurement device suitable for being used for determining a quantity of a first radioisotope of a source term according to the present invention.

In FIG. 1, a device 10 suitable for being used within the scope of the present invention can be seen.

The measuring device 10 then comprises a docking station 11, optionally provided with a scales 12 intended to measure the mass of a package.

The measurement device 10 also comprises at least one gamma detector (also referred to as gamma radiation detector), for example two gamma detectors 13 and 14, arranged to measure a gamma radiation emitted by a package containing a source term and positioned on the docking station 12.

The two gamma detectors 13 and 14 are, for example, positioned on either side of the source term (in other words, diametrically opposed in relation to the package).

A gamma detector 13, 14 may then comprise a plurality of CZT type detection subunits (for example 4 subunits).

The measurement device 10 may also be equipped with a computer or a computing device comprising a computer program.

The computer program is then intended to process gamma radiation counts collected by the gamma detector(s) so as to determine the quantity of first radioisotope comprised in the source term according to a method detailed hereinafter in the present description.

The source term may be comprised in a package, or a barrel of radioactive waste contaminated by radioactive elements, and in particular contaminated by the first radioisotope.

The contaminated waste may comprise gloves, sleeves, or any other waste made for example of organic polymer material included hereinafter in the description under polyethylene.

The package thus forms a matrix wherein the organic polymer material and the radioactive elements are mixed.

According to a first embodiment of the present invention, the radioactive elements may comprise in particular the first radioisotope and, optionally, a second radioisotope.

A first gamma line is emitted by the first radioisotope.

A second line is also emitted either by the first radioisotope or by the second radioisotope provided that the latter is considered.

Hereinafter in the description, the second gamma line will be considered to be emitted by the second radioisotope. A person skilled in the art, based on the present description, will be able to adapt the latter to the case of the first and second gamma lines emitted by a single radioisotope, in this instance the first radioisotope.

The counts of the first gamma line and the second gamma line are performed by the detectors 13 and 14.

The second radioisotope may be the result of the disintegration of the first radioisotope according to a first conversion rate (the conversion rate is also referred to as branching factor "Γ"). However, the scope of the invention must not be limited to this aspect and unrelated first and second radioisotopes may be considered.

Optionally, the radioactive waste may also comprise at least a third radioisotope, particularly a third radioisotope of the same mass number as the first radioisotope. The first and third radioisotopes thus form a mixture wherein the respective mass proportions, hereinafter referred to as "isotopic composition" in the description, are assumed to be known for the implementation of the method for determining the quantity of first radioisotope.

The isotopic composition of the mixture consisting of the first and third radioisotopes may be determined by applying a law of radioactive decay of said radioisotopes and considering the age of the mixture.

It will be accepted hereinafter in the description that the radioactive elements comprise the first, the second, and the third radioisotopes, and that the isotopic composition between the first and third radioisotopes is known. However, the embodiment of the present invention does not necessarily imply the presence of the third isotope.

By way of example, the first radioisotope is plutonium 241 which emits a first gamma line at 148 KeV, whereas the second radioisotope, obtained by disintegration a of the first radioisotope, is uranium 237 which, for its part, emits a second gamma line at 208 KeV. In this example, plutonium 241 disintegrates, by emitting a 0 type radiation, to americium 241 which forms the third radioisotope.

The counts of the first and second gamma lines collected by the gamma detector(s) make it possible in theory to estimate the quantity of first radioisotope contained in the source term.

However, the counts are generally attenuated by the package matrix and by varying self-absorption phenomena dependent on the mass and geometry of the source term. In other words, the package as a whole (the matrix and the source term) forms a gamma radiation screen characterised, for each of the gamma radiation wavelengths, by an attenuation rate.

Also, particularly advantageously, the attenuation rates of the first and second gamma lines, referred to respectively as, first screening rate and second screening rate, are different.

Figure 2:
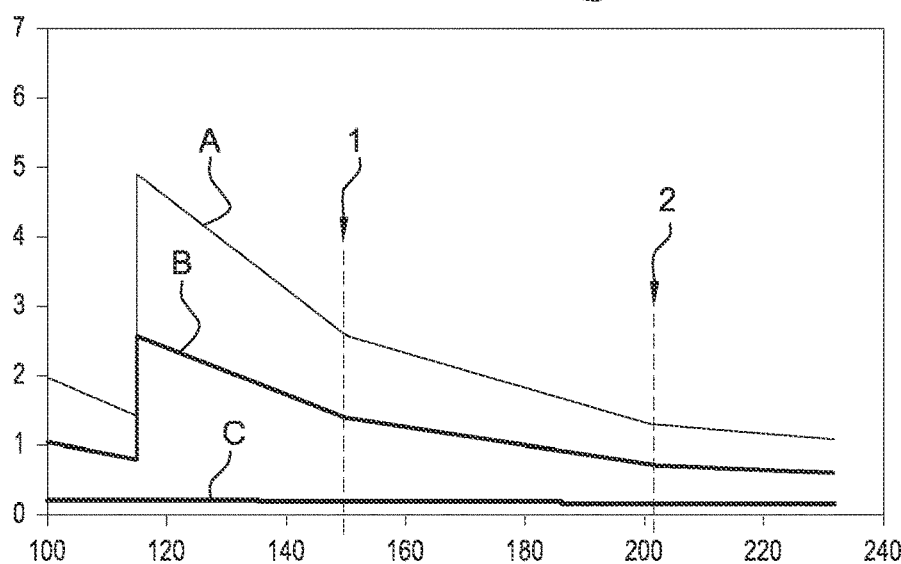
FIG. 2 is a graphic representation of the attenuation rate (vertical axis, in $cm^{-1}$) of a mixture containing polyethylene and uranium as a function of the length of the gamma radiation (horizontal axis, in KeV), in particular, curves A, B and C represent the attenuation of the gamma radiation, respectively, of pure uranium, of a 50/50 uranium-polyethylene mixture, and of pure polyethylene.

In this regard, FIG. 2 is a graphic representation of the attenuation rate of the gamma radiation for a mixture consisting of polyethylene and uranium. In particular, positions 1 and 2 in FIG. 2 indicate attenuation rates for a given screen, respectively, of the first gamma line and the second gamma line which are different. Thus, knowing the densities of polyethylene and uranium, as well as the respective first and second gamma line absorption coefficients thereof, makes it possible to establish the attenuation rates of said lines according to the respective proportions of polyethylene and uranium and the screen thickness.

The method according to the present invention then comprises a step a1) of determining the theoretical count ratio between the first and the second gamma lines emitted by the first and second radioisotopes in the absence of screening.

It is understood that the counts are theoretical counts at the level of the detector(s), and account for the efficiency of the detector at the energy in question, the number of detection subunits, but also the isotopic composition once:
  the third radioisotope is considered
  and/or the emission lines taken into account are obtained from two radioelements which are unrelated.

In particular, the efficiency and the number of detection subunits makes it possible to determine a conversion coefficient c/s/g for one and/or the other of the first and second gamma lines and associated with the first radioisotope.

"Conversion coefficient c/s/g" denotes a coefficient counting the number of a counts of a given gamma line per unit of time and unit of mass of the first radioisotope (therefore of the mass of the source term).

Consequently, once the corrected count of one or the other of the first and second gamma lines is known, the mass of the first radioisotope corresponds to the corrected count of one or the other of the first and second gamma lines divided by the conversion coefficient c/s/g of the gamma line in question and the measurement time by the gamma detector.

"Corrected gamma line count" denotes the number of counts that would be returned by the detector in the absence of a screen. In other words, the corrected count does not account for any attenuation by the screen.

The remainder of the description of the invention will be confined to the case of the second gamma line.

Knowing the relative proportions of the first and second radioisotopes makes it possible to weight the theoretical count per unit of time and per unit of mass, in the absence of screening, of the first and second gamma lines.

The relative proportions of the first and second radioisotopes are then accessible, for example by applying a law of radioactive decay involving the half-lives T1 and T2, respectively, of the first radioisotope and the second radioisotope.

Advantageously, once there is a relationship between the first and second radioisotopes and the radioactive period of the daughter is substantially less than that of the parent, the activities thereof are similar in which case the theoretical count ratio is constant over time.

The method according to the present invention also comprises a step a) of measuring by the at least one gamma detector, the net counts associated with the first and second gamma lines emitted, respectively, by the first and second radioisotopes contained in the source term. The measurement is advantageously performed according to two diametrically opposed positions in relation to the package.

It is understood that the net counts associated with the first and second gamma lines correspond to the actual attenuated counts.

Advantageously, step a) uses the two detectors 13 and 14.

The measurement may comprise the collection of the gamma radiations during a predetermined collection duration between, for example, 45 seconds and 60 seconds, particularly 45 seconds.

The net count may be obtained based on a gross count inferred from the background noise, actually measured by the gamma detector, adjusted for an idle time during which said gamma detector does not collect gamma radiation to the maximum of the capacity thereof.

Step a) may also comprise computing the ratio of the net counts of the second and first gamma lines.

Step a) is then followed by a step b) of determining an attenuation rate of the first and second gamma lines by the matrix of the source term.

In this regard, the net count ratio, measured in step a), makes it possible to determine the attenuation rate of the screen formed by the matrix.

This operation, which may be automated at computer program level, uses the parameters for establishing the graph in FIG. 2.

Said parameters then comprise the respective densities of polyethylene, uranium, absorption coefficients of uranium and polyethylene at the respective energies of the first and second gamma lines.

The computer program may comprise a mathematical solver which, by means of an iterative method and based on the ratio of the net counts of the first and second gamma lines, makes it possible to determine the polyethylene content (as a percentage) of the screen, the screen thickness, and the attenuation rate for each of the two gamma lines in question.

The mathematical resolution step known to a person skilled in the art is not described in the present invention.

Furthermore, the ratio of the net count of the second gamma line by the attenuation rate determined makes it possible to access the corrected count of said second gamma line defined above.

Finally, the method according to the present invention comprises a step c) of determining the mass of the first radioisotope comprised in the source term.

This step c) may then comprise firstly computing of the corrected count associated with the second gamma line. For example, the corrected count (for the attenuation by the equivalent screen) of the second gamma line corresponds to the net count of said second line by the detector divided by the attenuation applied by the screen (divided by the attenuation rate at the energy in question).

Thus, the mass of first radioisotope contained in the source term is then determined by dividing the corrected count associated with the second gamma line by the product formed by the measurement time and the conversion coefficient c/s/g.

In the case of a bulky package, the main "hot" spot may be offset in relation to said source term, and generate a count estimation error of the first and second gamma lines.

"Main "hot" spot" denotes the most radiative zone of the source term.

Also, once the method uses two gamma detectors 13 and 14, two estimations of the count of the second gamma line are obtained. A deviation in relation to 1 of the ratio of these two estimations conveys an offset of the main hot spot.

In order to overcome this problem, the solver includes a correction table of the mean estimated mass value according to the ratios of the estimations of the mass of first radioisotope for each of the detectors.

Figure 3:
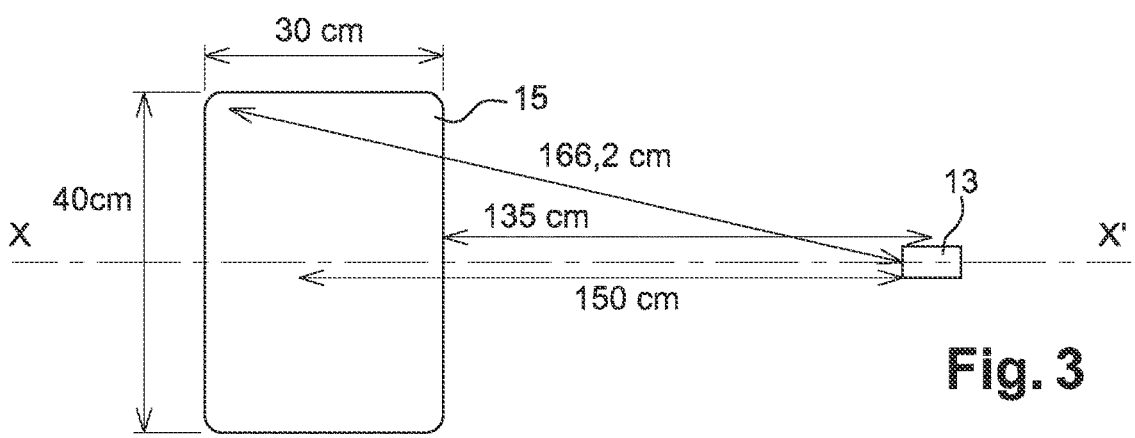
FIG. 3 is a schematic representation of a source term contained in a package and of a gamma detector taken as an example for determining a corrective coefficient.

In this regard, the following table shows a method for determining the corrective coefficient. In this example, the source term, herein considered as localised, is assumed to emit 100 counts, and two gamma detectors are disposed symmetrically on either side of the source term 15 and in alignment along an axis XX' (FIG. 3).

| Mean | C ratio | coeff | min | max | d0° | d180° | Offset cm |
|---|---|---|---|---|---|---|---|
| 100 | 1.03 | 1.000 | 99 | 101 | 151 | 149 | 1 |
| 100 | 1.05 | 1.001 | 97 | 103 | 152 | 148 | 2 |
| 100 | 1.08 | 1.001 | 96 | 104 | 153 | 147 | 3 |
| 100 | 1.11 | 1.002 | 95 | 106 | 154 | 146 | 4 |
| 100 | 1.14 | 1.003 | 94 | 107 | 155 | 145 | 5 |
| 100 | 1.17 | 1.005 | 92 | 109 | 156 | 144 | 6 |
| 101 | 1.21 | 1.007 | 91 | 110 | 157 | 143 | 7 |
| 101 | 1.24 | 1.009 | 90 | 112 | 158 | 142 | 8 |
| 101 | 1.27 | 1.011 | 89 | 113 | 159 | 141 | 9 |
| 101 | 1.31 | 1.013 | 88 | 115 | 160 | 140 | 10 |
| 102 | 1.34 | 1.016 | 87 | 116 | 161 | 139 | 11 |
| 102 | 1.38 | 1.019 | 86 | 118 | 162 | 138 | 12 |
| 102 | 1.42 | 1.023 | 85 | 120 | 163 | 137 | 13 |
| 103 | 1.45 | 1.027 | 84 | 122 | 164 | 136 | 14 |
| 103 | 1.49 | 1.031 | 83 | 123 | 165 | 135 | 15 |
| 103 | 1.53 | 1.035 | 82 | 125 | 166 | 134 | 16 |
| 104 | 1.58 | 1.039 | 81 | 127 | 167 | 133 | 17 |
| 104 | 1.62 | 1.044 | 80 | 129 | 168 | 132 | 18 |
| 105 | 1.66 | 1.049 | 79 | 131 | 169 | 131 | 19 |

The "offset cm" column corresponds to offsets of the main hot spot in relation to the centre of the source term 15.

The "d0°" and "d180°" columns correspond to the distances of the main hot spot in relation to the gamma detectors.

The "min" and "max" columns correspond, respectively, to the actual counts of each of the gamma detectors. The "mean" and "C ratio" columns are, respectively, the means and the ratios of the "min" and "max" columns.

The "coeff" column is the ratio of the data of the "mean" column and the corrected count (100 counts in this case), and corresponds to the correction coefficient to be applied once the ratio of the estimations of the two gamma detectors conveys an offset of the main hot spot.

The offset estimation may also make use of further models, for example considering a source linear, that a person skilled in the art, with their general knowledge, is capable of carrying out.

The present invention then makes it possible to measure, in reasonable times, the mass of first radioisotope contained in a source term.

This measurement time then limits the exposure of the subjects to radiation, but makes it possible to reduce the cycle times required for managing and assembling source terms in waste barrels.

The present invention also relates to a measurement device 10 suitable for determining a quantity of a first radioisotope contained in a source term, the device comprising:
- at least two gamma detectors 13 and 14;
- a docking station 11 of the source term, the docking station being provided with a scales 12;
- a computer 15 intended to process gamma ray counts collected by the gamma detectors, said computer being also provided with a computer program suitable for determining, based on the gamma ray counts, the quantity of first radioisotope comprised in the source term.

What is claimed is:

1. Method for determining a quantity of a first radioisotope of a source term contained in a package, said first radioisotope is suitable for emitting a first gamma line, a second gamma line is also suitable for being emitted either by the first radioisotope or by a second radioisotope of the source term, the first gamma line and the second gamma line are suitable for being attenuated, each according to a different attenuation rate, by the matrix of the package and the source term per se, the method comprising the following steps:
   a) a step of measuring, by at least one gamma detector and according to two diametrically opposed positions in relation to the package, net counts associated with the first and second gamma lines emitted;
   b) in the knowledge of the ratio of the counts of the first and second gamma lines in the absence of attenuation and based on the results of step a), a step of determining the attenuation rates of the first and second gamma lines by the package matrix;
   c) a step of determining, based on the attenuation rate of one or the other of the first and second gamma lines determined in step b), the quantity of first radioisotope contained in the source term.

2. Method according to claim 1, wherein the second gamma line is emitted by the second radioisotope, and the method further comprising a step a1) of determining the theoretical count ratio between the first and the second gamma lines emitted by the first and second radioisotopes in the absence of attenuation.

3. Method according to claim 2, wherein the emission ratios of the first and second gamma lines are stable over time.

4. Method according to claim 2, wherein the second radioisotope is the result of the radioactive disintegration of the first radioisotope.

5. Method according to claim 2, wherein the half-life T2 of the second radioisotope is substantially less than the half-life T1 of the first radioisotope.

6. Method according to claim 2, wherein the source term further comprises a third radioisotope, of the same mass number as the first radioisotope, the isotopic composition between the first and third radioisotopes being known.

7. Method according to claim 6, wherein the method comprises a determination of the isotopic composition.

8. Method according to claim 1, wherein the method further comprises a step of determining of a conversion coefficient c/s/g of one or the other of the first and second radioisotopes for counting one or the other of the first and second gamma lines.

9. Method according to claim 8, wherein the conversion coefficient is also determined based on the distance D of the least one gamma detector in relation to the source term.

10. Method according to claim 1, wherein the attenuation rate of one or the other of first and second gamma lines is representative of an equivalent screen comprising a mixture of polyethylene and uranium characteristics of the package matrix, said equivalent screen being characterised by a thickness, referred to as screen thickness, and a polyethylene content.

11. Method according to claim 1, wherein step a) is carried out with two gamma detectors such that two estimations of the quantity of first radioisotope of the source term are obtained following step c).

12. Method according to claim 11, wherein, once the radio of the two estimations conveys an offset of the source term in relation to the gamma detectors, the mean of said estimations is corrected by a correction coefficient.

13. Method according to claim 6, wherein the first radioisotope comprises plutonium 241, the second radioisotope uranium 237, and the third radioisotope americium 241.

14. Measurement device suitable for implementing the method for determining a quantity of a first radioisotope contained in a source term according to claim 1, the device comprising:
   at least one gamma detector;
   a docking station of the source term, the docking station being provided with a scale;
   a computer intended to process gamma line counts collected by the gamma detectors, said computer being also provided with a computer program suitable for determining, based on the gamma ray counts, the quantity of first radioisotope comprised in the source term.

* * * * *

UNITED STATES PATENT AND TRADEMARK OFFICE
CERTIFICATE OF CORRECTION

PATENT NO. : 11,175,415 B2  
APPLICATION NO. : 16/954577  
DATED : November 16, 2021  
INVENTOR(S) : Jacky Jehanno Page 1 of 1

It is certified that error appears in the above-identified patent and that said Letters Patent is hereby corrected as shown below:

In the Specification

Column 5, Line 10, "emitting a 0 type radiation" should read --emitting a β type radiation--.

Signed and Sealed this  
Twenty-seventh Day of August, 2024

Katherine Kelly Vidal  
*Director of the United States Patent and Trademark Office*